US012079179B2

(12) United States Patent
Khan (10) Patent No.: US 12,079,179 B2
(45) Date of Patent: Sep. 3, 2024

(54) SYSTEMS, METHODS, AND MEDIA FOR ACCESSING DERIVATIVE PROPERTIES FROM A POST RELATIONAL DATABASE UTILIZING A LOGICAL SCHEMA INSTRUCTION THAT INCLUDES A BASE OBJECT IDENTIFIER

(71) Applicant: Bentley Systems, Incorporated, Exton, PA (US)

(72) Inventor: Affan Khan, Exton, PA (US)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 18/077,486

(22) Filed: Dec. 8, 2022

(65) Prior Publication Data

US 2024/0193135 A1    Jun. 13, 2024

(51) Int. Cl.
*G06F 7/00* (2006.01)
*G06F 16/21* (2019.01)
*G06F 16/28* (2019.01)

(52) U.S. Cl.
CPC .......... *G06F 16/211* (2019.01); *G06F 16/285* (2019.01)

(58) Field of Classification Search
CPC ................ G06F 16/211; G06F 16/285; G06F 16/24524; G06F 16/972
See application file for complete search history.

(56) References Cited

U.S. PATENT DOCUMENTS

| | | | | |
|---|---|---|---|---|
| 7,693,812 B2* | 4/2010 | Lim | .................. | G06F 16/24564 |
| | | | | 707/999.001 |
| 8,719,250 B2* | 5/2014 | Chong | .................... | G06F 16/25 |
| | | | | 707/714 |
| 9,881,055 B1* | 1/2018 | Kapoor | ............... | G06F 16/2452 |
| 2004/0015496 A1* | 1/2004 | Anonsen | ............... | G06F 16/289 |
| 2008/0228697 A1* | 9/2008 | Adya | .................... | G06F 16/212 |

(Continued)

OTHER PUBLICATIONS

Anonymous: "Object-Relational Developer's Guide 2.3 Inheritance in SQL Object Types" Jan. 25, 2022, Retrieved from Internet: https://web.archive.org/web/20220125003836/https://docs.oracle.com/en/database/oracle/oracle-database/21/adobj/inheritance-in-sql-object-types.html#GUID-04C3724F-B028-4523-A626-72BF854557FB [retreived on Mar. 19, 2024], section 2.3.11, 21 pages.

(Continued)

*Primary Examiner* — Mohammed R Uddin
(74) *Attorney, Agent, or Firm* — Cesari and McKenna, LLP (57) ABSTRACT

Techniques are provided for accessing derivative properties from a database utilizing a logical schema instruction that includes a base object identifier. A logical schema instruction may be received and analyzed to identify a predefined keyword. A portion of the logical schema instruction, that is located in relation to the predefined keyword, may be identified. The portion may include a base object identifier and a property identifier, e.g., a derivative property identifier. In an embodiment, the identified portion of the logical instruction is not translated to a database schema instruction at prepare time. Instead, an extract function is executed at runtime access and analyze a database table that corresponds to a base object associated with the base class identifier. A property in the database table that corresponds to the property identifier may be identified. Advantageously, a base object identifier may be utilized to access a derivative property.

20 Claims, 5 Drawing Sheets

(56) References Cited

U.S. PATENT DOCUMENTS

| | | | | |
|---|---|---|---|---|
| 2010/0082646 | A1* | 4/2010 | Meek | G06F 16/252 |
| | | | | 707/752 |
| 2011/0113054 | A1* | 5/2011 | McLean | G06F 16/8358 |
| | | | | 707/769 |
| 2018/0218044 | A1* | 8/2018 | Wong | G06F 16/2282 |
| 2022/0004556 | A1* | 1/2022 | Arnold | G06F 16/24566 |

OTHER PUBLICATIONS

Anonymous: "Object-Relational Developer's Guide", Jan. 25, 2022, Retrieved from the Internet: https://web.archive.org/web/20220125003836/https://docs.oracle.com/en/database/oracle/oracle-database/21/adobj/functions-and-operators-useful-withobjects.html#GUID-0C9A9AA4-2556-4643-8F1E-9C719B916695 [retrieved on Mar. 19, 2024] section 2.4.8, 7 pages.

Anonymous, "Can I reuse a col. across subclasses in a Hibernate table-per-hierarchy inheritance strategy?", Apr. 15, 2010, Retrieved from the Internet: https://stackoverflow.com/questions/2646960/can-i-reuse-a-column-across-subclasses-in-a-hibernate-table-per-hierarchy-inheri/2648952#2648952 [retrieved on Mar. 19, 2024].

Anonymous, "ECSQL" Jul. 3, 2022, Retrieved from the Internet https://web.archive.org/web/2022070390150/https://www.itwinjs.org/v2/learning/ecsql/ [retrieved on Mar. 18, 2024], 9 pages.

International Search Report and Written Opinion mailed Apr. 12, 2024 for International Application No. PCT/ US2023/082636 filed Dec. 6, 2023 for Bentley Systems, Incorporated, 16 pages.

* cited by examiner

SYSTEMS, METHODS, AND MEDIA FOR ACCESSING DERIVATIVE PROPERTIES FROM A POST RELATIONAL DATABASE UTILIZING A LOGICAL SCHEMA INSTRUCTION THAT INCLUDES A BASE OBJECT IDENTIFIER

BACKGROUND

Technical Field

The present disclosure relates generally to computer-based infrastructure software, and more specifically to techniques for accessing derivative properties from a post relational database utilizing a logical schema instruction that includes a base object identifier.

Background Information

Throughout the design, construction, and operation of an infrastructure (e.g., buildings, plants, factories, roads, railways, bridges, etc.) it is often desirable to model the infrastructure using infrastructure modeling software. The data representing objects in the model may be stored in a database (e.g., post relational database) consisting of tables with rows and columns. The database may be organized according to a database schema that is optimized for performance, file size, and other characteristics. The column and row identifiers of the table may be auto-generated and unrelated to the type of data stored. For example, a column that stores a pressure value may have a column identifier of "22". As such, the complex database schema and non-intuitive identifiers make it difficult for users to access (e.g., modify and/or query) the data using database schema instructions.

To overcome such deficiencies, conventional systems may utilize a logical schema that sits "on top" of the database schema, where the logical schema is mapped to the database schema. The logical schema may utilize user intuitive identifiers (e.g., names) that allow the user to more intuitively access the data stored in the database. Specifically, the user may provide logical schema instructions that may be translated into database schema instructions to access the data stored in the database.

The logical schema may be organized as a hierarchy of objects (e.g., classes). The objects and its properties may map to rows/columns of the database. The hierarchy may include a base object (e.g., base class) with one or more properties (e.g., base properties). Additionally, the hierarchy may include one or more derivative objects or sub-objects (e.g., derivative classes) that inherit the base properties and further include their own properties. For example, consider a model of a plant that includes 20 different pumps and 15 different flow controllers. For this example, there may be a base class with an identifier, e.g., name, of Equipment in the hierarchy of the logical schema. The base class may have associated base properties that include instance ID, class ID, name, code, and manufacturer.

Additionally, there may be a derivative class in the hierarchy for each of the different 35 pieces of equipment, e.g., the 20 different pumps and the 15 different flow controllers. Specifically, there may be a derivative class with a different identifier, e.g., name, for each of the 20 different pumps and each of the 15 different flow controllers. Each of the 35 derivative classes may inherit the properties of the base class. Therefore, and in this example, each of the 35 derivative classes would have the base properties of instance ID, class ID, name, code, and manufacturer. Each derivative class may also have its own derivative properties. For example, each derivative class for each of the 20 pumps may have derivative properties of flow, pressure, speed, and power. Similarly, each derivative class for each of the 15 flow controllers may have derivative properties of inputs, outputs, pressure, and flow range.

Each row/instance of the database table would correspond to a different piece of equipment of the 35 pieces of equipment. Therefore, and for this example, the database table would include 35 rows. A row corresponding to a particular piece of equipment may have corresponding columns that store values for the properties for the piece of equipment. For example, the row for a particular pump may have a column that corresponds to each base property and a column that corresponds to each of its derivative properties. Each column may store a value for the corresponding property of the particular pump.

With conventional systems, the properties of a derivative class cannot be accessed using a logical schema instruction that includes the identifier (e.g., name) of the base class. Specifically, the base class identifier cannot be utilized to access the derivative properties because the base class does not inherit the properties of its derivative classes. For example, a logical schema instruction that includes the base class identifier of Equipment cannot be utilized to access the derivative properties of the pumps and the flow controllers.

Therefore, and according to conventional systems, the identifiers (e.g., names) of the derivative classes must be known and included in the logical schema instructions to access the properties of the derivative classes. For example, let it be assumed that a user wants to know the power of each of the 20 different pumps using logical schema instructions. In this example, the user would need to know the identifiers of each of the 20 derivative classes that are associated with the 20 different pumps. If the identifiers are not known, the user may have to issue a logical schema query (meta query) instruction to find the identifiers of the 20 different derivative classes that have a power property. The user may then issue additional logical schema query instructions, that include the 20 identifiers of the derivative classes, to obtain the power values for the 20 pumps.

Accessing derivative properties in this conventional manner is time consuming and laborious for users and is further processor intensive since a meta query may need to be utilized to find the identifiers for the derivative classes that include a power property. With such conventional systems, the derivative properties cannot be obtained in an efficient and user intuitive manner.

SUMMARY

Techniques are provided for accessing derivative properties from a post relational database utilizing a logical schema instruction that includes a base object identifier according to one or more embodiments described herein.

In an embodiment, a processor, e.g., a property module executed by the processor, may receive a logical schema instruction. The logical schema instruction may be received from a user operating a client device. The processor may analyze the logical schema instruction to determine if the logical schema instruction includes a predefined keyword. In an embodiment, the predefined keyword is $-$>. In an embodiment, the processor may analyze the logical schema instruction to semantically identify the predefined keyword in the logical schema instruction.

Based on determining that the predefined keyword is included in the logical schema instruction, the processor may identify a portion of the logical schema instruction that is at a particular location relative to the predefined keyword. In an embodiment, the processor identifies a portion of the logical schema instruction that follows the predefined keyword in the logical schema instruction. In an embodiment, the portion of the logical schema instruction includes at least a property identifier, e.g., a derivative property identifier, and a base class identifier.

The processor may prevent the portion of the logical schema instruction from being translated at prepare time, and instead execute an extract function at runtime. Specifically, and at runtime, the processor may access and analyze each row of the database table that corresponds to the base class identifier included in the logical schema instruction. Each row of the table corresponds to a different piece of equipment that is represented by a different derivative class. The processor may determine, for each row, if a derivative property exists and if there is a value for the derivative property if it exists. If a row of the database includes the derivative property and there is a value, the property module 118 may extract the value of the derivative property from the database table. The extracted values may be provided as output. The output may be displayed, for example, on a display screen of a client device.

Advantageously, a derivative property can be accessed using a logical schema instruction that includes an identifier of a base class. As such, the one or more embodiments as described herein provide an improvement over conventional systems that require that the logical schema instruction include an identifier of a derivative class to access derivative properties. With conventional systems, an error will be incurred at prepare time if a logical schema instruction includes a base class identifier with a derivative property identifier. The one or more embodiments as described herein prevent such an error from occurring, and instead execute an extract function at runtime to access the derivative properties using the base class identifier. By preventing the error, the one or more embodiments as described herein provide an improvement in the technological field of computer program execution.

Further, and with conventional techniques, a user may have to utilize a meta query to determine the identifiers of all the derivative classes that include the derivative property of interest. The one or more embodiments as described herein do not require the use of such a meta query, and instead a single base class identifier can be utilized to search derivative properties of all derivative classes of the base class. As such, the one or more embodiments as described herein conserve processing resources when compared to conventional systems.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
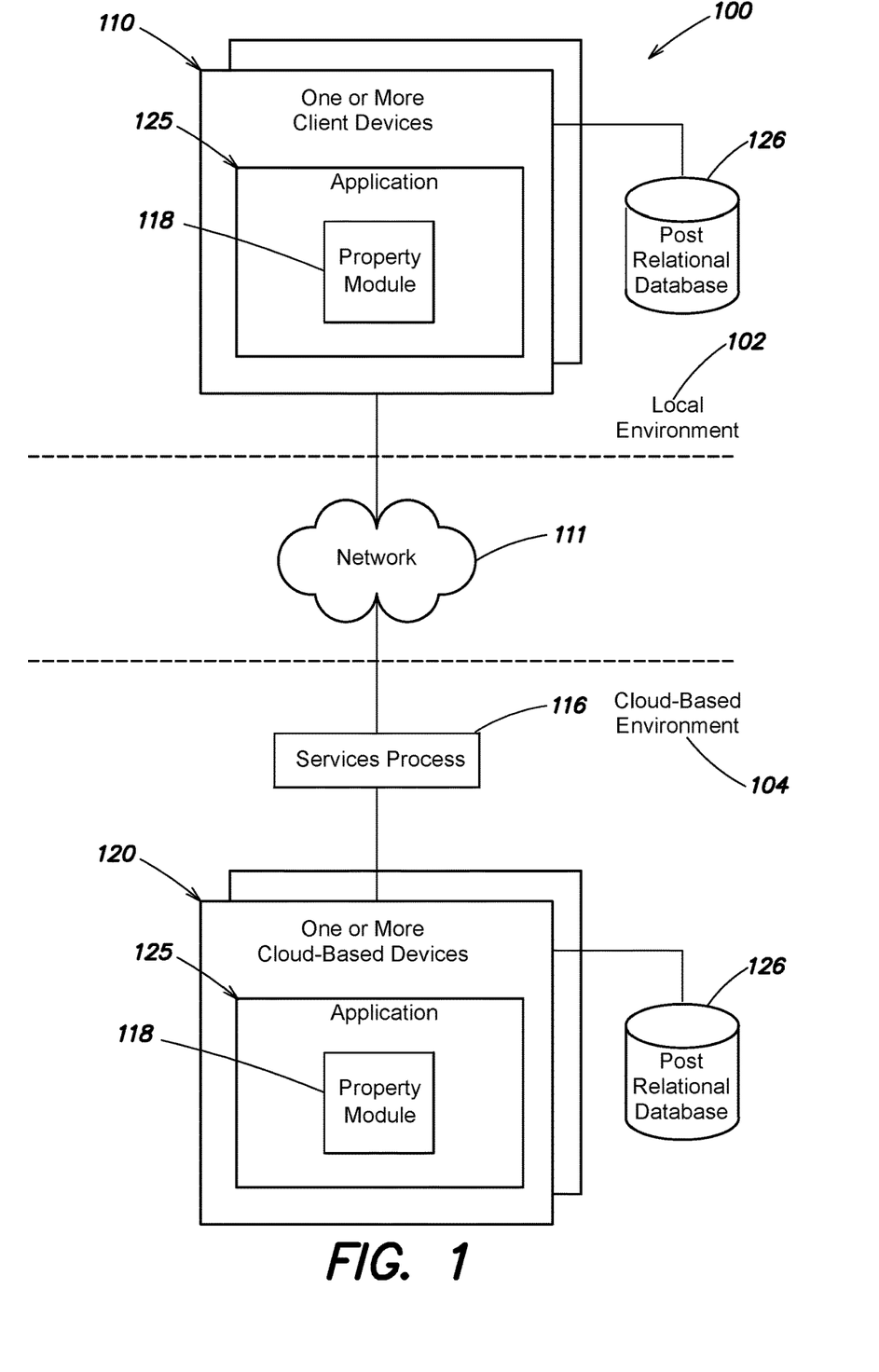
FIG. 1 is a high-level block diagram of an example architecture for accessing derivative properties from a post relational database utilizing a logical schema instruction that includes a base object identifier according to one or more embodiments described herein.

FIG. 1 is a high-level block diagram of an example architecture 100 for accessing derivative properties from a post relational database utilizing a logical schema instruction that includes a base object identifier according to one or more embodiments described herein. The architecture 100 may be divided into a local environment 102 and a cloud-based environment 104. The local environment may include one or more local client devices 110 that are local to an end-user. The cloud-based environment 104 may include one or more cloud-based client devices 120 that are remote from the end-user and that are accessible to the end-user via a network 111 (e.g., the Internet).

Post relational database 126 may be located in the local environment 102, the cloud-based environment 104, or replicated in both the local environment 102 and cloud-based environment 104. The post relational database 126 may consists of one or more tables with rows and columns. The tables may store data for objects in a model that represents an infrastructure, e.g., plant. Although FIG. 1 depicts the post relational database 126 being separate from client devices 102 and cloud based devices 120, it is expressly contemplated that the client devices 102 and cloud base devices 120 may include post relational database 126.

The post relational database 126 may be organized according to a database schema. In an embodiment, the database schema is a Structured Language Query (SQL) schema. In an embodiment, a logical schema may sit "on top" of the database schema of the post relational database. The logical schema may be mapped to the database schema. As such, users may utilize logical schema instructions, via client device 100, to access (e.g., modify and/or query) data stored on the post relational database 126. In an embodiment the logical schema is an object oriented schema. In an embodiment, the logical schema is ECSQL that is a text-based command language for create, read, update, and delete operations. For example, a user of client device 110 may issue an ECSQL query that may be translated to a SQL query using mapping information, and the translated SQL query may be utilized to access data from the database 126 that consists of one or more tables.

Each computing device, e.g., one or more local client devices 110 and one or more cloud-based client devices 120, may include processors, memory/storage, a display screen, and other hardware (not shown) for executing software/modules, storing data, and/or displaying information.

A local client device 110 may provide a variety of user interfaces and non-processing intensive functions. For example, a local client device 110 may provide a user interface, e.g., a graphical user interface and/or a command line interface, for receiving user input and displaying output according to the one or more embodiments described herein. A services process 116 may coordinate operation of the one or more local client devices 110 and the one or more cloud-based client devices 120 such that, for example, the one or more local client devices 110 may communicate with and access the one or more cloud-based client devices 120 via network 111.

The one or more client devices 110 and/or one or more cloud-based client devices 120 may store and execute application 125 that may access derivative properties from a post relational database 126 utilizing a logical schema instruction that includes a base object identifier as will be described in further detail below. In an embodiment, the application 125 may be infrastructure modeling software. In an embodiment, the application 125 may be infrastructure modeling software that is based on the iTwin platform available from Bentley Systems, Inc.

The one or more local client devices 110 may download and store application 125 according to the one or more embodiments described herein. The one or more local client devices 110 may utilize one or more user interfaces to access, via services process 116, the application 125 that is stored on the one or more cloud-based client devices 120 according to the one or more embodiments described herein. As such, the application 125 may be stored on local client devices 110, cloud-based devices 120, or replicated and stored on both client devices 110 and cloud-based devices 120.

The application 125 may include a property module 118. The property module 118 may access derivative properties from a post relational database utilizing a logical schema instruction that includes a base object identifier. Specifically, and as will be described in further detail below, the property module 118 may receive a logical schema instruction that includes at least (1) a predefined keyword, (2) a base object identifier. e.g., a base class identifier, and (3) a derivative property identifier. In response to receiving the logical schema instruction, the property module 118 may prevent at least a portion of the logical schema instruction from being translated at prepare time, and instead execute an extract function at runtime. Based on executing the extract function, the property module 118 may obtain, from relational database 126, a value of the derivative property.

It is expressly contemplated that the property module 118 may be hardware, software, or a combination thereof. In an embodiment, the processor (not shown) of a local client device 110 may be coupled to the memory (not shown) of the local client device 110, wherein the processor is configured to execute the decimation module. In addition or alternatively, the processor (not shown) of a cloud-based client device 120 may be coupled to the memory (not shown) of the cloud-based client device 120, wherein the processor is configured to execute the property module 118.

As will be described in further detail below, the logical schema may be organized as a hierarchy that includes a plurality of objects, e.g., classes. An object, as described herein, may be referred to as a class, node, or analogous term. A base object, e.g., base class, of the hierarchy may have corresponding derivative objects, e.g., derivative classes. As will be described in further detail below, because of the structure/organization of the hierarchy, conventional systems require that logical schema instructions include an identifier of a derivative class to access the properties of the derivative class.

According to the one or more embodiments as described herein, and as will be described in further detail below, a logical schema instruction that includes an identifier of a base object can be utilized to access the properties of its derivative classes. That is, the logical schema instructions, according to the one or more embodiments as described herein, need not include the identifier of each derivative class to access the properties of each derivative class.

Hierarchy of Logical Schema

Figure 2A:
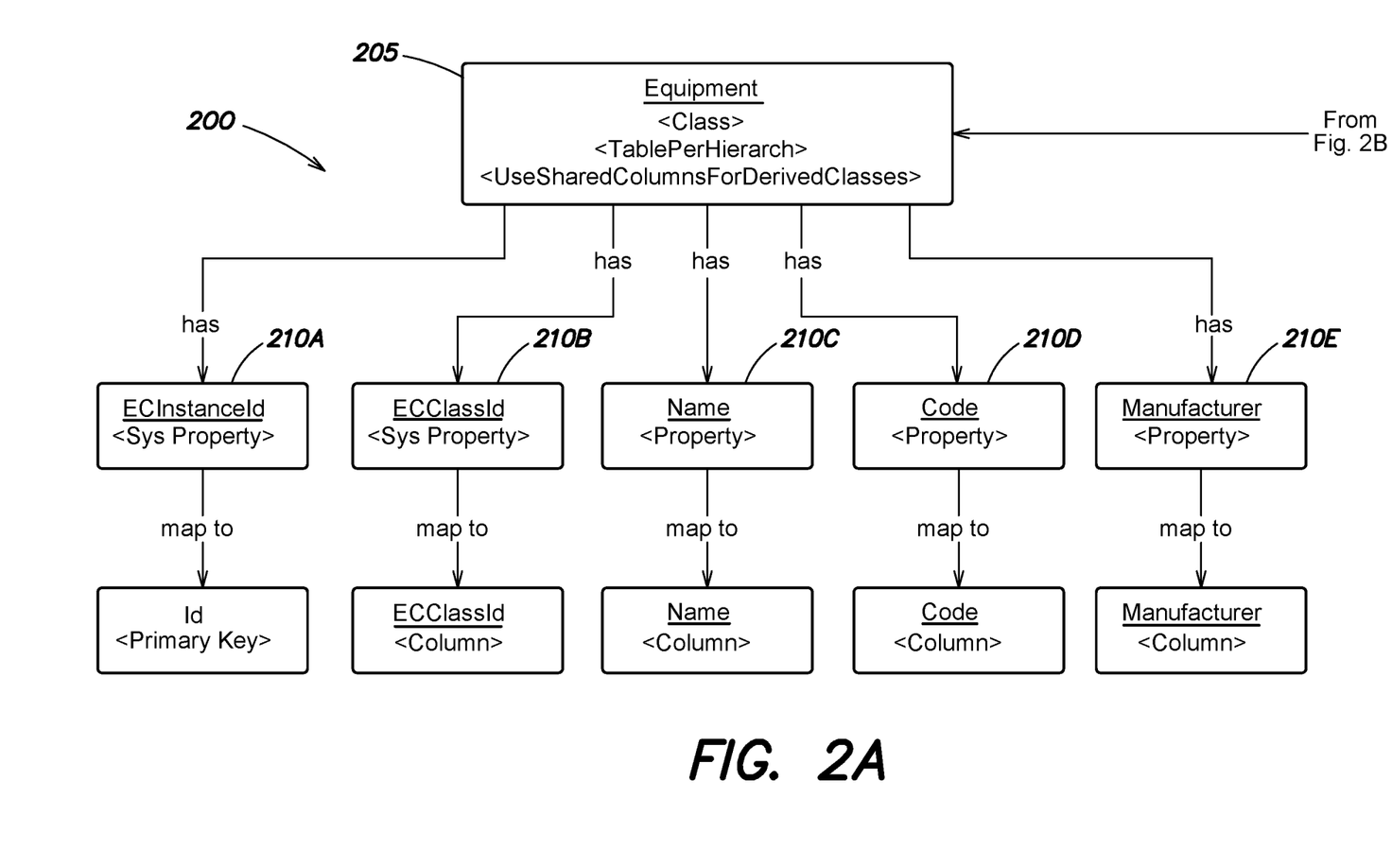
FIGS. 2A and 2B are an illustrative example of a simplified hierarchy of a logical schema according to one or more embodiments as described herein.
Figure 2B:
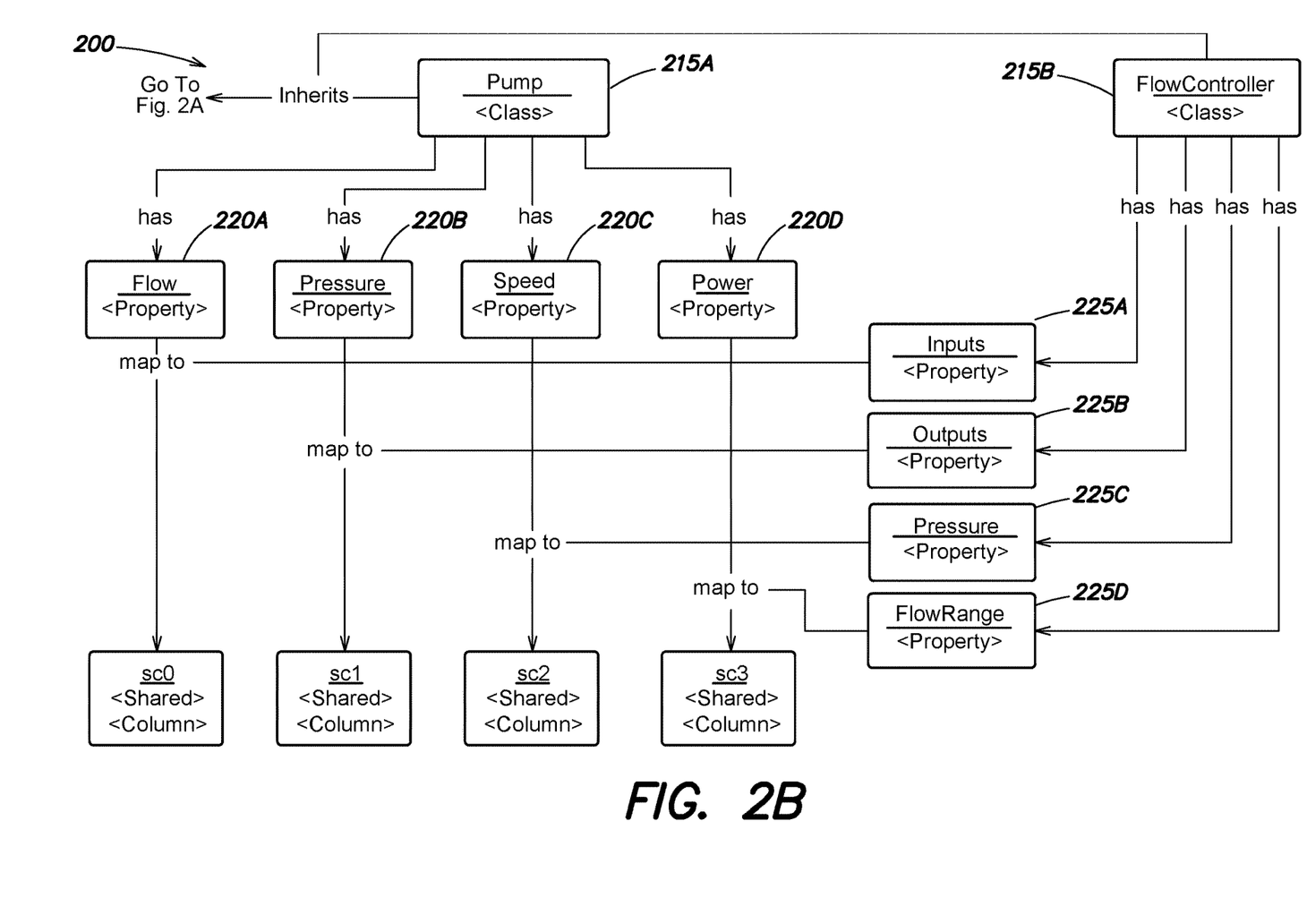

FIGS. 2A and 2B are an illustrative example of a simplified hierarchy of a logical schema according to one or more embodiments as described herein. For simplicity and ease of understanding, FIGS. 2A and 2B only include a single base class and two derivative classes. However, it is expressly contemplated that the hierarchy according to the one or more embodiments described herein may include many base classes and/or derivative classes. Further, FIGS. 2A and 2B may be described as a hierarchy of classes, e.g., base class and derivative classes. However, it is expressly contemplated that the reference to classes is for illustrative purposes only. As such, the hierarchy for a logical schema according to the one or more embodiments as described herein may include objects, nodes, or other similar entities that are organized hierarchically and where a base object does not inherit the properties of its derivative objects. Further, the classes of FIGS. 2A and 2B may be referred to as having a name or an identifier. It is expressly contemplated that name and identifier are interchangeable terms that may be utilized to refer to the classes in FIGS. 2A and 2B.

The hierarchy 200 of FIGS. 2A and 2B include a base class 205 with an identifier of Equipment. Base class 205 of equipment may generally represent a plurality of different pieces of equipment that are included in the model representing an infrastructure. For the example of FIGS. 2A and 2B, let it be assumed that the hierarchy 200 is for a model representing a plant with equipment. Base class 205 also includes properties, i.e., base properties. For this example, the base properties may be properties that generally apply to different pieces of equipment. In the example of FIGS. 2A and 2B, the base properties include an ECInstanceId property 210A, an ECClassId property 210B, a Name property 210C, a Code property 210D, and a Manufacturer property 210E. As indicated by "map to" in FIG. 2A, each of the base properties maps to a particular column in the database table, e.g., post relational database 126, that stores particular data, e.g., value.

For example, ECInstanceId 210A may map to an Id column in the database table, where the Id column may contain a unique value that can be used to uniquely identify each row of the database table. In an embodiment, the Id value is equivalent to a row number or a row identifier. The other base properties may map to other corresponding columns as indicated in FIG. 2A and may store other data corresponding to the identifier for the property.

Hierarchy 200 also includes derivative class 215A and derivative class 215B as depicted in FIG. 2B. Derivative class 215A, with an identifier of Pump, may correspond to a pump in the model representing the plant. Derivative class 215B, with an identifier of FlowController, may correspond to a flow controller in the model representing the plant. That is, derivative classes 215 and 215B correspond to different pieces of equipment in the model of the plant.

In an embodiment, a base class and a derivative class may have a parent-child relationship. Specifically, base class 205 may be referred to as a parent of derivative classes 215A and 215B. Additionally, derivative classes 215A and 215B may each be referred to as a child of base class 205. Derivative classes 215A and 215B may also be referred to as subclasses of base class 205. Further base class 205 may be referred to as the genus, and derivative classes 215A and 215B may each be referred to as a species. In the example of FIGS. 2A and 2B, there is only a base class level, e.g., base class 205, and a single derivative class level, e.g., derivative classes 215A and 215B. However, it is expressly contemplated that the hierarchy according to the one or more embodiments as described herein may include additional levels. For example, base class 205 may have a parent. In this scenario, the parent of base class 205 may be referred to as the grandparent of derivative classes 215A and 215B. As such, it is expressly contemplated that the hierarchy may have any number of levels.

According to the one or more embodiments as described herein, a derivative class inherits the properties of its base class, e.g., its parent class. However, a base class does not inherit the properties of its derivative classes, e.g., its children. As such, and as will be described in further detail below, derivative classes 215A and 215B (species) inherit the properties of base class 205 (genus). However, base class 205 (genus) does not inherit the properties of derivative classes 215A and 215B (species). If derivative classes 215A and 215B included grandparent classes, derivative classes 215A and 215B would also inherit the properties of the grandparent classes. As such, each class inherits all the properties of the classes (e.g., parent, grandparent, great-grandparent, etc.) from which it depends.

As explained above, derivative class 215A may correspond to a pump included in the model representing the plant. If an additional pump is included in the model, an additional derivative class with a different identifier (e.g., "Pump_2") would be included in hierarchy 200. Referring back to the example of FIGS. 2A and 2B, derivative class 215A inherits all the base properties of base class 205. This is indicated by "inherits" in FIG. 2B. Accordingly, derivative class 215A has an ECInstanceId property 210A, an ECClassId property 210B, a Name property 210C, a Code property 210D, and a Manufacturer property 210E.

Additionally, derivative class 215A includes other properties, i.e., derivative properties, for the pump in the model. In this example, the derivative properties include a Flow property 220A, a Pressure property 220B, a Speed property 220C, and a Power property 220D. As indicated by "map to" in FIG. 2B, each of the properties for derivative class 215A maps to a particular column in the database table that stores particular data, e.g., a particular value, for the pump of the model. Specifically, a particular row of the database table may correspond to the pump. For this example, let it be assumed that row 1 of the database table corresponds to the pump. Therefore, each of the properties (e.g., base properties and derivative properties) for the derivative class 215A maps to an entry in the database table that corresponds to row 1 and a different column.

For example, the entry of the database table that corresponds to row 1 and column "Id" stores a value for an instance ID of the pump. The entry of the database table that corresponds to row 1 and column "ECClassId" stores a value for a class ID of the pump. The entry of the database table that corresponds to row 1 and column "Name" stores a value for a name of the pump. The entry of the database table that corresponds to row 1 and column "Code" stores a value for a code of the pump. The entry of the database table that corresponds to row 1 and column "Manufacturer" stores a value for a manufacturer of the pump. The entry of the database table that corresponds to row 1 and column "sc0" stores a value for a flow of the pump. The entry of the database table that corresponds to row 1 and column "sc1" stores a value for a pressure of the pump. The entry of the database table that corresponds to row 1 and column "sc2" stores a value for a speed of the pump. The entry of the database table that corresponds to row 1 and column "sc3" stores a value for a power of the pump.

Hierarchy 200 also includes derivative class 215B with an identifier of FlowController. Derivative class 215B inherits all the base properties of base class 205. This is indicated by "inherits" in FIG. 2B. Additionally, derivative class 215B includes properties, i.e., derivative properties, for the flow controller in the model of the plant. In this example, the properties include an Inputs property 225A, an Outputs property 225B, a Pressure property 225C, and a FlowRange property 220D. As indicated by "map to" in FIG. 2B, each of the properties (e.g., base properties and derivative properties) of the flow controller map to the same row and different columns of the database table. The mapping of the properties of derivative class 215B is similar to the mapping as described above with reference to derivative class 215A.

Although derivative classes 215A and 215B of FIG. 2B inherit the properties of base class 205, base class 205 does not inherit the properties of derivative classes 215A and 215B. Specifically, because base class 205 (genus) is a parent of derivative classes 215A and 215B (species), base class 205 does not inherit the derivative properties from derivative classes 215A and 215B.

Operation of Conventional Systems with Hierarchy

With conventional systems, properties of a derivative class can only be accessed utilizing logical schema instructions that include the identifier (e.g., name) of the derivative class. For example, let it be assumed that a user wants to access (e.g., query or modify) the properties of the pump, referenced in the description of FIGS. 2A and 2B, utilizing a logical schema instruction. To access the properties of the pump, the logical schema instruction must include the identifier of derivative class 215A. An example logical schema instruction, that may be utilized to access all properties of the pump, may be:

SELECT Name, Code, Manufacturer, Flow, Pressure, Speed, Power
FROM ts.Pump

The above logical schema instruction includes property identifiers of Name, Code, Manufacturer, Flow, Pressure, Speed, and Power. In addition, the logical schema instruction includes a derivative class identifier of Pump, e.g., "ts.Pump", for derivative class 215A. The logical schema instruction instructs the conventional system to select values, from the database table, that correspond to the pump and the properties identified in the logical schema instruction.

Based on receiving the above logical schema instruction, conventional systems may translate the logical schema instruction into a database schema instruction during prepare time. Prepare time, as referred herein, is one or more points in time before runtime. Runtime, as referred herein, is one or more points in time where the relational database 126 is accessed. To perform the translation, the hierarchy 200 may be traversed to determine the column identifiers of the database table that correspond to the property identifiers included in the logical schema instruction.

Specifically, the derivative class identifier of Pump is included in the logical schema instruction and may map to a particular table. In this example, let it be assumed that the derivative class identifier of Pump maps to a table identified by ts_Pump. As such, the hierarchy 200 is traversed to identify derivative class 215A that corresponds to the derivative identifier of Pump included in the logical schema instruction. In response to identifying derivative class 215A, conventional systems may traverse hierarchy 200 to identify the properties of the derivative class 215A that correspond to the property identifiers included in the logical schema instruction.

In this example, the property identifiers of Name, Code, and Manufacturer are included in the logical schema instruction. These property identifiers correspond to base properties of Name property 210C, Code property 210D, and Manufacturer property 210E. As indicated herein, base properties are inherited by derivative classes. As such, derivative class 215A has base properties of Name property 210C, Code property 210D, and Manufacturer property 210E. Because these base properties exist for derivative class 215A, the base properties are accessible utilizing the derivative class identifier of Pump in the logical schema instruction. As a result, the base properties can be mapped to column identifiers of the database table, e.g., post relational database 126, that corresponds to derivative class identifier of ts.Pump. In this example, the base properties of Name property 210C, Code property 210D, and Manufacturer property 210E map to column identifiers of Name, Code, and Manufacturer, respectively, of table ts_Pump.

Additionally, the property identifiers of Flow, Pressure, Speed, and Power are also included in the logical schema instruction. These property identifiers correspond to derivative properties of Flow property 220A, Pressure property 220B, Speed property 220C, and Power property 220D. Derivative class 215A has these derivative properties. Because these derivative properties exist for derivative class 215A, the derivative properties are accessible utilizing the derivative class identifier of Pump in the logical schema instruction. As a result, the derivative properties can be mapped to column identifiers of the database table, e.g., post relational database 126, that corresponds to the derivative class identifier of ts.Pump. In this example, derivative properties of Flow property 220A, Pressure property 220B, Speed property 220C, and Power property 220D map to column identifiers of sc0, sc1, sc2, and sc3, respectively, of table ts_Pump.

Once all of the properties included in the logical schema instruction are mapped to database columns, the database schema instruction, e.g., a translated instruction, can be generated. An example database schema instruction translated from the above logical schema instruction may be:

SELECT Name, Code, Manufacturer, sc0, sc1, sc2, sc3 FROM ts_Pump

For this database schema instruction, ts_Pump is an identifier for a particular table that is mapped to the class identifier of ts.Pump in the above logical schema instructions. Name, Code, Manufacturer, sc0, sc1, sc2, and sc3 for this database schema instruction correspond to particular columns, of table ts_Pump, that respectively map to property identifiers of Name, Code, Manufacturer, Flow, Pressure, Speed, and Power in the above logical schema instruction. The database schema instruction may be executed at runtime to retrieve the results from the database table. In this example, conventional systems would execute the database schema instruction at runtime to obtain the values from entries of the database table that correspond to the row of the pump and the columns identified in the database schema instruction.

Accordingly, and with conventional systems, the derivative class identifier, e.g., Pump, needs to be known and included in the logical schema instruction to access the properties of the derivative class. Therefore, if a user wants to obtain the pressure values for 20 pumps that are included in a plant model, the user will need to know the 20 identifiers of the derivative classes corresponding to the 20 pumps. If the identifiers are not known, the user would have to perform a query (e.g., meta query) to determine the 20 identifiers of the 20 derivative classes.

Furthermore, and with conventional systems, properties of derivative classes cannot be accessed utilizing the identifier of a base class because of the structure/organization of hierarchy 200. Specifically, because base class 205 does not inherit the properties of derivative classes 215A and 215B, the identifier of base class 205 cannot be utilized to access the properties of derivative classes 215A and 215B.

For example, let it be assumed that the following logical schema instruction is received:

SELECT Name, Code, Manufacturer, Power FROM ts.Equipment

This above logical schema instruction includes the base class identifier of Equipment, e.g., "ts.Equipment", that corresponds to base class 205. The property identifiers of Name, Code, and Manufacturer included in the above logical schema instruction are base properties. As such, base class 205 has these base properties. Because these base properties exist for base class 205, the base properties are accessible utilizing the base class identifier of Equipment in the logical schema instruction. As a result, the base properties can be mapped to column identifiers of the database table, e.g., post relational database 126. In this example, the base properties of Name property 210C, Code property 210D, and Manufacturer property 210E map to column identifiers of Name, Code, and Manufacturer, respectively.

The logical schema instruction also includes a property identifier of Power. This property identifier corresponds to a derivative property, e.g., Power property 220D. Because a base class does not inherit derivative properties, conventional systems encounter an error when attempting to translate the above logical schema instruction into a database schema instruction.

Specifically, hierarchy 200 is traversed using the base class identifier of Equipment. Specifically, the hierarchy 200 is traversed to identify base class 205 that corresponds to identifier Equipment included in the logical schema instruction.

The hierarchy 200 is then traversed from base class 205 in an attempt to identify a property with an identifier of Power. In this example, base class 205 does not have a property with an identifier of Power. Instead, the identifier of Power corresponds to Power property 220D that is a derivative property of derivative class 215A. Because base class 205 does not inherit the properties of derivative class 215A, base class 205 does not have access to Power property 220D. Because Power property 220D is not accessible through base class 205, a column identifier of the database table that corresponds to Power Property 220D cannot be determined. As a result, the translation cannot occur during prepare time and an error will occur instead. Accordingly, and with conventional systems, a base class identifier cannot be utilized in a logical schema instruction to access derivative properties.

Operation of the One or More Embodiments as Described Herein

The one or more embodiments as described herein overcome such deficiencies. Specifically, a logical schema instruction may include a predefined keyword and a base class identifier to access derivative properties. More specifically, and as will be described in further detail below, the property module 118 may analyze a logical schema instruction. Based on the analysis, the property module 118 may semantically identify a predefined keyword in the logical schema instruction. Based on the identification of the predefined keyword, the property module 118 may prevent the translation of at least a portion of the logical schema instruction during prepare time. The portion of the logical schema instruction may include a base class identifier and a derivative property identifier.

The property module 118 may execute an extract function at runtime to access the derivative property for derivative classes of the base class.

In an embodiment, the predefined keywork is $->. In alternative embodiments, the predefined keyword may be any character or string of characters that is not being used for an existing purpose or function.

Figure 3:
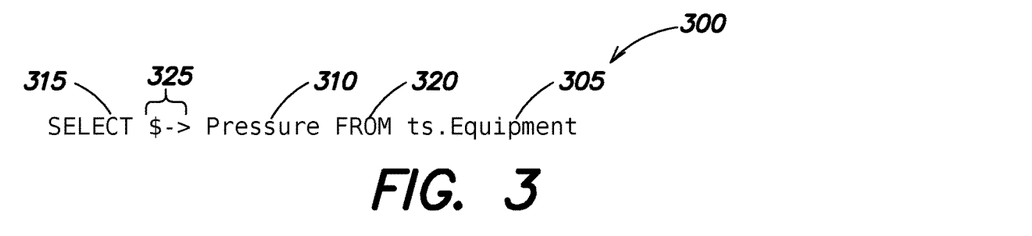
FIG. 3 is an illustrative example of a logical schema instruction for accessing derivative properties utilizing a base class identifier according to the one or more embodiments as described herein.

FIG. 3 is an illustrative example of a logical schema instruction for accessing derivative properties utilizing a base class identifier according to the one or more embodiments as described herein.

Logical schema instruction 300 includes base class identifier 305 of Equipment, e.g., "ts.Equipment", for base class 205 of FIG. 2A. Additionally, the logical schema instruction 300 includes property identifier 310 of Pressure. In this example of FIG. 3, property identifier 310 of Pressure is a derivative property identifier. Specifically, property identifier 310 of Pressure identifies Pressure property 220B of derivative class 215A and Pressure property 225C of derivative class 215B. The pressure property is not a base property, e.g., base class 205 does not have a base property that is identified by Pressure.

Further, the logical schema instruction 300 includes SELECT 315 and FROM 320. In an embodiment, SELECT 315 may instruct property module 118 to obtain a value for a property corresponding to the property identifier 310, e.g., Pressure, included in the logical schema instruction 300. In an embodiment, FROM 320 may instruct property module 118 to obtain the property value for the class corresponding to the base class identifier 305, e.g., ts.Equipment, included in the logical schema instruction 300.

The property module 118 may analyze the logical schema instruction 300. Based on the analysis, the property module 118 may semantically identify predefined keyword 325, which is $-> in this example, in the logical schema instruction 300. Specifically, the property module 118 may semantically identify the predefined keyword 325 and determine that the predefined keyword 325 follows SELECT 315 in the logical schema instruction 300. Based on the semantic identification and determination, the property module 118 may determine that the identifiers (e.g., base class identifier 305 and property identifier 310) in the portion of the logical schema instruction 300 that follows predefined keyword 325 are not to translated at prepare time.

Instead of performing the translation at prepare time for the identifiers that follow predefined keyword 325, the property module 118 may execute an extract function at runtime. Specifically, and at runtime, the property module 118 may access and analyze each row of the database table that corresponds to the base class identified by Equipment. Each row of the table may correspond to a different piece of equipment that is represented by a different derivative class. Based on the accessing and analysis, the property module 118 may determine if each row includes the derivative property (e.g., pressure property) and if there is a value when the derivative property exists. If a row of the database includes the derivative property and there is a value, the property module 118 may extract the value of the derivative property from the database table. The extracted values may be provided as output. The output may be displayed, for example, on a display screen of client device 110.

In this example, and with reference to FIG. 2B, the rows of the database table that correspond to the pump and the flow controller both have a pressure property. Specifically, the property module 118 analyzes the row of the database table corresponding to the pump and determines that a pressure property exists for the pump and a value is included in column sc1 of the database table. As such, the property module 118 extracts the pressure value from column sc1 and the row corresponding to the pump. Additionally, the property module 118 analyzes the row of the database table corresponding to the flow controller and determines that a pressure property exists for the flow controller and a value is included in column sc2 of the database table. As such, the property module 118 extracts the pressure value from column sc2 and the row corresponding to the flow controller.

Based on the execution of the extract function at runtime, the property module 118 may generate an output (e.g., query results) that consists of the pressure value for the pump and the pressure value for the flow controller. If, for example, a pressure property for the flow controller did not exist, the property module 118 may return NULL or a different value/indicator that indicates that the pressure property does not exist for the flow controller. Similarly, if the pressure property for the flow controller does not have a value, the property module 118 may return NULL or a different value/indicator that indicates that the pressure property does not have a value for the flow controller. Therefore, in these two different examples, the property module 118 would generate an output that consists of the pressure value for the pump and NULL for the flow controller. The output may be displayed on, for example, a display screen of client device 110.

Consider another example where a database table has a different row for each of 20 pumps with a pressure property and each of 15 flow controllers with a pressure property. The logical schema instruction 300 of FIG. 3 may execute at runtime in a similar manner as described above to extract the 35 pressure values from the 35 rows of the database table. As such, the logical schema instruction 300 that includes a single base class identifier, e.g., Equipment, can be utilized to extract the 35 pressure values. This is in contrast to conventional systems that would require that the logical schema instructions include the 35 derivative class identifiers to extract the 35 pressure values.

Figure 4:
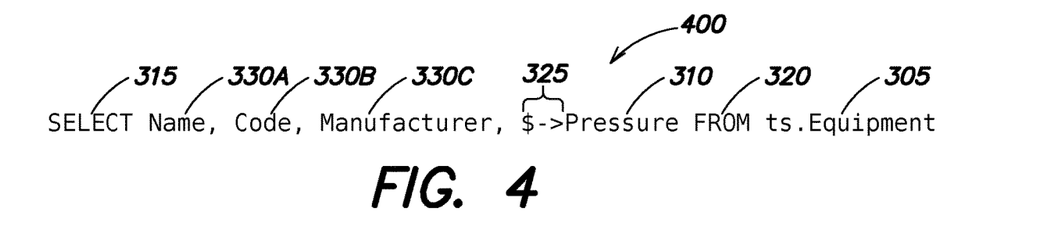
FIG. 4 is an illustrative example of another logical schema instruction for accessing derivative properties utilizing a base class identifier according to the one or more embodiments as described herein.

FIG. 4 is an illustrative example of another logical schema instruction for accessing derivative properties utilizing a base class identifier according to the one or more embodiments as described herein.

Logical schema instruction 400 includes property identifiers 330A-330C of Name, Code, and Manufacturer, respectively. In this example, property identifiers 330A-330C are base class identifiers. The property module 118 may analyze logical schema instruction 400. Based on the analysis, the property module 118 may semantically identify property identifiers 330A-330C and determine that they precede predefined keyword 325. That is, the property identifiers 330A-330C do not follow predefined keyword 325. As such, the property module 118 may perform a translation to a database scheme at prepare time using property identifiers 330A-330C. For example, and based on the translation at prepare time, the property module 118 may generate the following database schema instruction:

SELECT Name, Code, Manufacturer, FROM ts_Equipment

Additionally, and during the analysis of logical schema instruction 400, the property module 118 may semantically identify predefined keyword 325 in a similar manner as described above with reference to FIG. 3. Additionally, the property module 118 may determine that the derivative property identifier 310 of Pressure and the base class 305 identifier of Equipment follow predefined keyword 325. Based on the semantic identification and determination, the property module 118 may determine that translation at prepare time should not occur for the portion of the logical schema instruction 400 that includes property identifier 310 of Pressure and base class identifier 305 of Equipment. Instead, the property module 118 may determine that an extract function should be executed at runtime for this portion of the logical schema instruction 400.

At runtime, the property module 118 may execute the extract function and may also execute the database schema instruction generated at prepare time. The extract function and database schema instruction may be executed in parallel or serially at runtime. The extract function may be executed in a similar manner as described above with reference to FIG. 3. The property module 118 may execute the database schema instruction at runtime to obtain the name value, code value, and manufacturer value, from database table for each of the pump and the flow controller. As such, and in this example, the output (e.g., query results) would consist of (1) a name value, code value, manufacturer value, and a pressure value for the pump, and (2) a name value, code value, manufacturer value, and a pressure value for the flow controller. The property module 118 may then output the obtained values on a display screen of the client device 100.

If, for example, the flow controller does not include a pressure property or the pressure property does not have a value, the output for the flow controller would include the values for the other properties and the value for the pressure property would be NULL or a different type of similar indicator.

Figure 5:
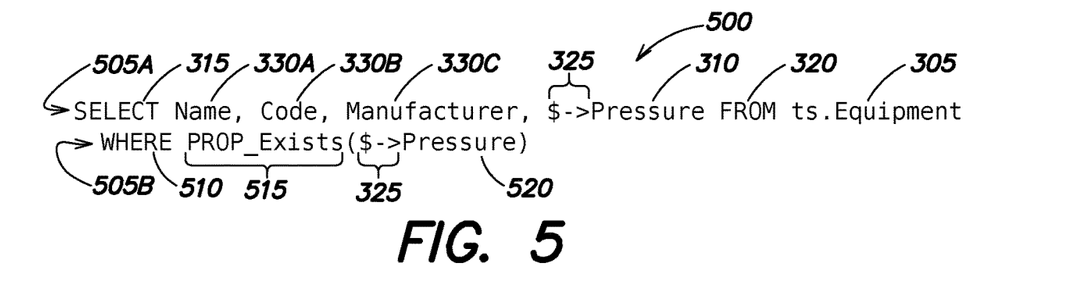
FIG. 5 is an illustrative example of a logical schema instruction for accessing derivative properties utilizing a base class identifier and a property exist filter according to the one or more embodiments as described herein.

FIG. 5 is an illustrative example of a logical schema instruction for accessing derivative properties utilizing a base class identifier and a property exist filter according to the one or more embodiments as described herein.

Logical schema instruction 500 includes portions 505A and 505B. Portion 505A is identical to the logical schema instruction 400 of FIG. 4. Portion 505A would execute in a similar manner as described above with reference to FIG. 4 to generate outputs, e.g., query results. However, logical schema instruction 500 includes portion 505B that may be a filter for the output that is produced based on the execution of portion 505A.

Portion 505B includes WHERE 510. In an embodiment, WHERE 510 may instruct property module 118 to filter the query results obtained from the execution of portion 505A. The filter may be based on the arguments that follow WHERE 510. In this example, the property module 118 may analyze portion 505B and may semantically identify predefined keyword 325. Additionally, property module 118 determines that predefined keyword 325 comes after WHERE 510. Based on the semantic identification and determination, the property module 118 may determine that the query results obtained from the execution of portion 505A are to be filtered at runtime using the arguments included in portion 505B.

Specifically, PROP_EXISTS 515 follows WHERE 510 in portion 505B. PROP_EXISTS 515 includes, as input arguments, predefined keyword 325 and property identifier 520 of Pressure. In an embodiment, PROP_EXISTS 515 may instruct the property module 118 that the query results should only include those results that include a pressure property. As such, property module 118 filters out those results that do not include a pressure property.

In this example, both the pump and flow controller have a pressure property. As such, the output (e.g., query results) would consist of (1) a name value, code value, manufacturer value, and a pressure value for the pump, and (2) a name value, code value, manufacturer value, and a pressure value for the flow controller.

If, for example, the flow controller does not include a pressure property, the property module 118 would filter out the result of the flow control at runtime based on the execution of portion 505B. As such, the output (e.g., query results) would consist of a name value, code value, manufacturer value, and a pressure value for the pump.

If, however, the flow controller included a pressure property, but the pressure property did not have a value, the property module 118 would not filter out the result of the flow controller. As such, the output (e.g., query results) would consist of (1) a name value, code value, manufacturer value, and a pressure value for the pump, and (2) a name value, code value, manufacturer value, and NULL for the pressure for the flow controller.

Figure 6:
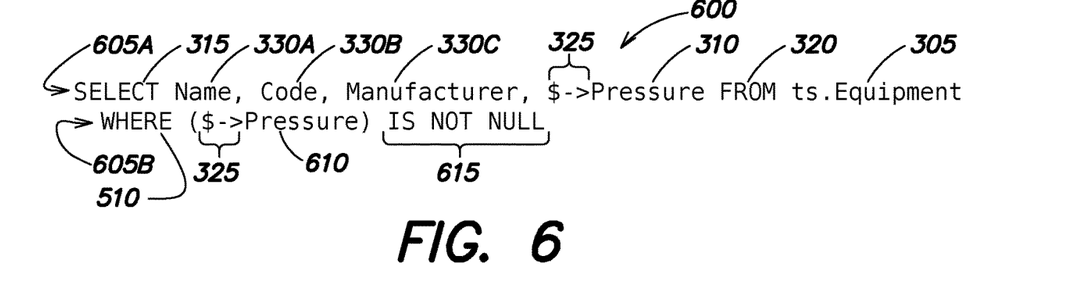
FIG. 6 is an illustrative example of a logical schema instruction for accessing derivative properties utilizing a base class identifier and a not NULL filter according to the one or more embodiments as described herein.

FIG. 6 is an illustrative example of a logical schema instruction for accessing derivative properties utilizing a base class identifier and a not NULL filter according to the one or more embodiments as described herein.

Logical schema instruction 600 includes portions 605A and 605B. Portion 605A is identical to portion 505A of FIG. 5 and the logical schema instruction 400 of FIG. 4. Portion 605A would execute in a similar manner as described above with reference to FIGS. 4 and 5 to generate outputs, e.g., query results. Logical schema instruction 600 includes portion 605B. Portion 605B may be a filter for the output that is produced based on the execution of portion 605A.

In this example, the property module 118 may analyze portion 605B and semantically identifies predefined keyword 325. Additionally, property module 118 may determine that predefined keyword 325 follows WHERE 510. Based on the semantic identification and determination, the property module 118 may determine that the query results obtained from the execution of portion 605A are to be filtered at runtime based on the arguments in portion 605B.

Specifically, property identifier 610 of Pressure follows predefined keyword 325. Further, IS NOT NULL 615 follow property identifier 510. Accordingly, the property module 118 may determine that the query results obtained based on the execution of portion 605A are to be filtered such that the query results only include those results where the pressure property value is not null.

For this example, let it be assumed that both the pump and flow controller have a property pressure and the values are not NULL. As such, the output (e.g., query results) would consist of (1) a name value, code value, manufacturer value, and a pressure value for the pump, and (2) a name value, code value, manufacturer value, and a pressure value for the flow controller.

Figure 7:
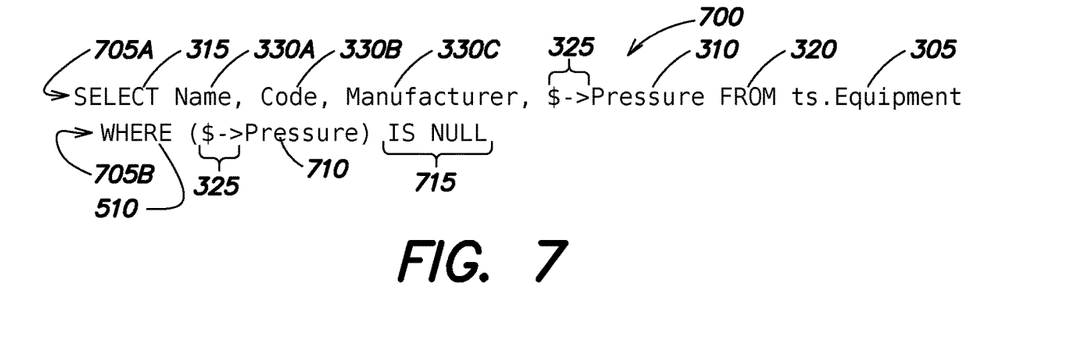
FIG. 7 is an illustrative example of a logical schema instruction for accessing derivative properties utilizing a base class identifier and a NULL filter according to the one or more embodiments as described herein.

FIG. 7 is an illustrative example of a logical schema instruction for accessing derivative properties utilizing a base class identifier and a NULL filter according to the one or more embodiments as described herein.

Logical schema instruction 700 includes portions 705A and 705B. Portion 705A is identical to portion 605A of FIG. 6, portion 505A of FIG. 5, and the logical schema instruction 400 of FIG. 4. Portion 605A would execute in a similar manner as described above with reference to FIGS. 4, 5, and 6 to generate outputs, e.g., query results. Portion 705B may be a filter for the output that is produced based on the execution of portion 705A.

In this example, the property module 118 may analyze portion 705B and semantically identifies predefined keyword 325. Additionally, property module 118 may determine that predefined keyword 325 follows WHERE 510. Based on the semantic identification and determination, the property module 118 may determine that the query results obtained from the execution of portion 705A are to be filtered at runtime based on the arguments in portion 705B.

Specifically, property identifier 710 of Pressure follows predefined keyword 325. Further, IS NULL 715 follow property identifier 510. Accordingly, the property module 118 may determine that the query results obtained based on the execution of portion 705A are to be filtered at runtime such that the query results only include those results where the pressure value is null.

For this example, let it be assumed that the pump has a pressure property value this is not NULL and the flow controller has a pressure property value that is NULL. As such, the output (e.g., query results) would consist of a name value, code value, manufacturer value, and a pressure value for the flow controller.

Figure 8:
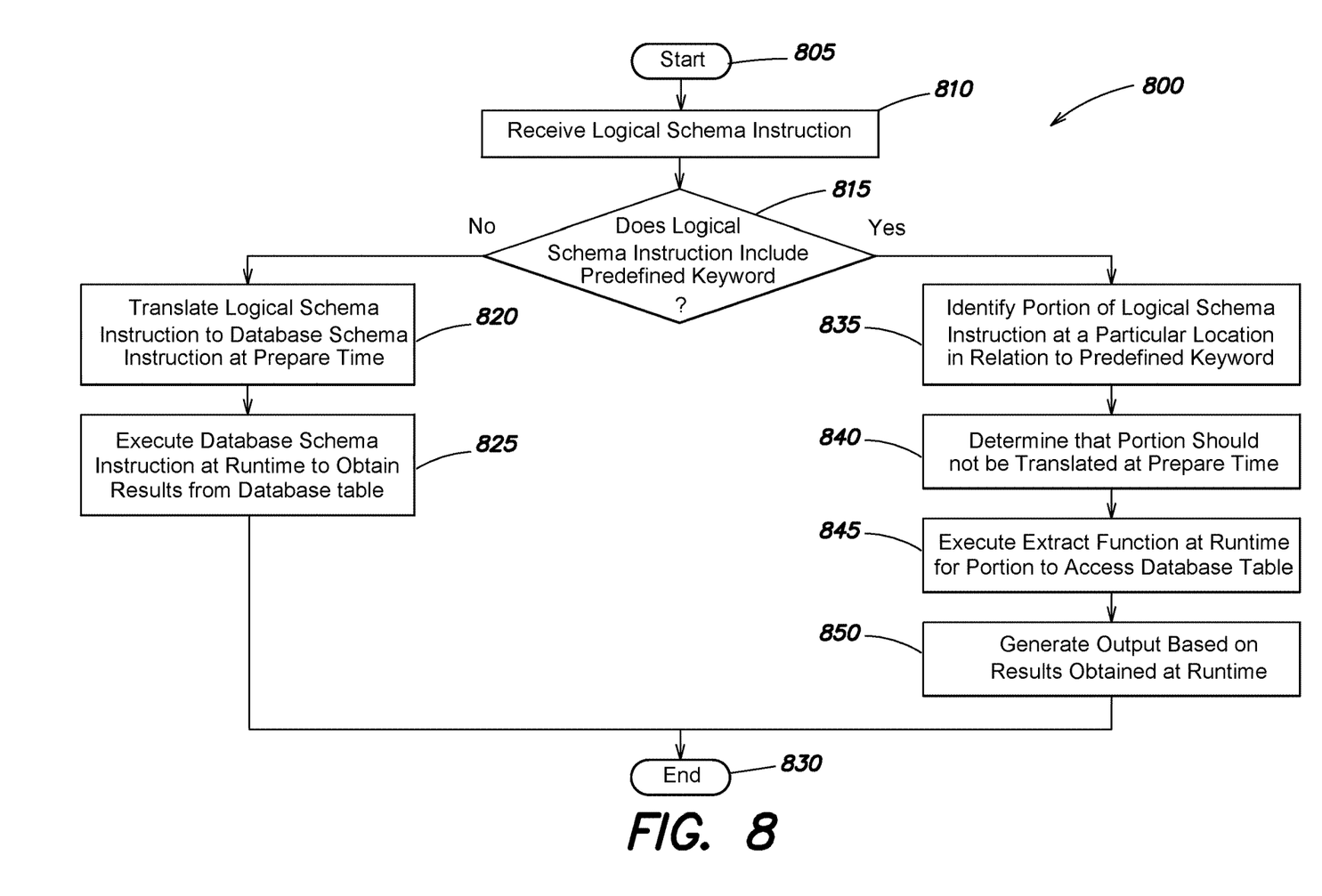
FIG. 8 is a flow diagram of a sequence of steps for accessing derivative properties from a post relational database utilizing a logical schema instruction that includes a base object identifier according to one or more embodiments described herein.

FIG. 8 is a flow diagram of a sequence of steps for accessing derivative properties from a post relational database utilizing a logical schema instruction that includes a base object identifier according to one or more embodiments described herein.

The procedure 800 starts at step 805 and continues to step 810 where the property module 118 receives a logical schema instruction. For this example, let it be assumed that logical schema instruction 400 of FIG. 4 is received. In an embodiment, the logical instruction may be provided by a user utilizing client device 110.

The procedure continues to step 815 and the property module 118 determines if the logical schema instruction includes a predefined keyword. In this example, the predefined keyword 325 is $->. The property module 118 may analyze logical schema instruction 400 and semantically identify predefined keyword 325 in logical schema instruction 400. As such, and in this example, the property module 118 determines that logical schema instruction 400 includes the predefined keyword.

If, however, the property module 118 determines that the logical schema instruction does not include the predefined keyword at step 815, the procedure continues to step 820. At step 820, the property module 118 translates the logical schema instruction to a database schema instruction at prepare time. The procedure continues from step 820 to 825 and the property module 118 executes the database schema instruction at runtime to obtain results from a database table, e.g., post relational database 126. The procedure then ends at step 830.

Continuing with the example, the property module 118 determines that logical schema instruction 400 includes the predefined keyword at step 815. As such, the procedure continues from step 815 to step 835. At step 835, the property module 118 identifies a portion of the logical schema instruction that is at a particular location in relation to the predefined keyword. For example, the property module 118 may identify a portion of the logical schema instruction 400 that follows predefined keyword 325. In this example, the portion that follows the predefined keyword 325 includes a property identifier 310, e.g., a derivative property identifier, of Pressure and a base class identifier 305 of Equipment, e.g., "ts.Equipment".

The procedure continues to step 840 and the property module 118 determines that the portion of the logical schema instruction identified at step 825 should not be translated at prepare time. It is noted that other portions of the logical schema instruction may be translated at prepare time. For example, the portion of the logical schema instruction 400 that precedes the predefined keyword 325 and includes property identifier 330A-330C may be translated to a database schema instruction at prepare time.

The procedure continues to step 845 and the property module 118 executes an extract function, at runtime, for the portion of the logical schema instruction to access a database table. Therefore, and instead of performing the translation at prepare time, the property module 118 may execute an extract function at runtime for the portion of the logical schema instruction that includes the derivative property identifier of Pressure and the base class identifier 205 of Equipment. Specifically, and at runtime, the property module 118 may access and analyze each row of the database table that corresponds to the base class identified by Equipment. Each row of the table may correspond to a different piece of equipment that is represented by a different derivative class. Based on the accessing and analysis, the property module 118 may determine if each row includes the derivative property and if there is a value if the derivative property exists. If a row of the database includes the derivative property and there is a value, the property module 118 may extract the value of the derivative property from the database table.

In this example, and with reference to FIG. 2B, the rows of the database table that correspond to the pump and the flow controller both have a pressure property. The property module 118 may analyze the row of the database table corresponding to the pump and determine that a pressure property exists for the pump and a value is included in column sc1 of the database table. As such, the property module 118 may extract the pressure value from column sc1 and the row corresponding to the pump. The property module 118 may analyze the row of the database table corresponding to the flow controller and determine that a pressure property exists for the flow controller and a value is included in column sc2 of the database table. As such, the property module 118 may extract the pressure value from column sc2 and the row corresponding to the flow controller.

It should be noted that the database schema instructions, for the other portions of the logical schema instruction that were translated at prepare time, may also be executed at runtime to obtain results. In an embodiment, the database schema instruction may be executed in parallel or serially with the extract function.

The procedure continues to step 850 and the property module 118 generates output based on the results obtained at runtime. In this example, the output (e.g., query results) would consist of (1) a name value, code value, manufacturer value, and a pressure value for the pump, and (2) a name value, code value, manufacturer value, and a pressure value for the flow controller. The property module 118 may then output the obtained values on a display screen of the client device 100. The procedure ends at step 830.

It should be understood that a wide variety of adaptations and modifications may be made to the techniques. For examples, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A system comprising:
   a processor coupled to a memory, the processor executing a software module of an application, the software module configured to:
   receive a logical schema instruction;
   determine if the logical schema instruction includes a predefined keyword;
   in response to determining the predefined keyword is included in the logical schema instruction, identify a portion of the logical schema instruction that is located at a particular location relative to the predefined keyword,
      wherein the portion includes at least a property identifier and a base object identifier; and
   execute, instead of performing a translation at prepare time for the portion, an extract function at runtime to access a database table corresponding to a base object identified by the base object identifier, wherein the extract function identifies a property in the database table utilizing the property identifier.

2. The system of claim 1, wherein the property identifier is a derivative property identifier.

3. The system of claim 1, wherein the base object has one or more base properties, and a derivative object of the base object has access to the base properties.

4. The system of claim 3, wherein the derivative object includes one or more derivative properties and the one or more derivative properties include the property.

5. The system of claim 4, wherein the base object does not contain the one or more derivative properties.

6. The system of claim 1, wherein the base object represents a category of a plurality of model objects included in a model representing an infrastructure, and wherein the property, associated with the property identifier, is for a particular model object included in the model and that is within the category.

7. The system of claim 1, wherein the base object is included in a hierarchy of class objects, and the hierarchy includes at least one or more derivative objects.

8. The system of claim 1, wherein the logical schema instruction is based on a logical schema that is separate from a database schema that is utilized to access the database table at runtime.

9. A method, comprising:
   receiving a logical schema instruction;
   determining if the logical schema instruction includes a predefined keyword;
   in response to determining the predefined keyword is included in the logical schema instruction, identifying, by a processor, a portion of the logical schema instruction that is located at a particular location relative to the predefined keyword,
      wherein the portion includes at least a property identifier and a base object identifier; and
   executing, instead of performing a translation at prepare time for the portion, an extract function by a software module at runtime to access a database table corresponding to a base object identified by the base object identifier, wherein the extract function identifies a property in the database table utilizing the property identifier.

10. The method of claim 9, wherein the property identifier is a derivative property identifier.

11. The method of claim 9, wherein the base object has one or more base properties, and a derivative object of the base object has access to the base properties.

12. The method of claim 11, wherein the derivative object includes one or more derivative properties and the one or more derivative properties include the property.

13. The method of claim 12, wherein the base object does not contain the one or more derivative properties.

14. The method of claim 9, wherein the base object represents a category of a plurality of model objects included in a model representing an infrastructure, and wherein the property, associated with the property identifier, is for a particular model object included in the model and that is within the category.

15. The method of claim 9, wherein the base object is included in a hierarchy of class objects, and the hierarchy includes at least one or more derivative objects.

16. The method of claim 9, wherein the logical schema instruction is based on a logical schema that is separate from a database schema that is utilized to access the database table at runtime.

17. A non-transitory computer readable medium having software encoded thereon, the software when executed by one or more computing devices operable to:
   receive a logical schema instruction;
   determine if the logical schema instruction includes a predefined keyword;
   in response to determining the predefined keyword is included in the logical schema instruction, identify a portion of the logical schema instruction that is located at a particular location relative to the predefined keyword,
      wherein the portion includes at least a property identifier and a base object identifier; and
   execute, instead of performing a translation at prepare time for the portion, an extract function by a software module at runtime to access a database table corresponding to a base object identified by the base object identifier, wherein the extract function identifies a property in the database table utilizing the property identifier.

18. The non-transitory computer readable medium of claim 17, wherein the property identifier is a derivative property identifier.

19. The non-transitory computer readable medium of claim 17, wherein the base object has one or more base properties, and a derivative object of the base object has access to the base properties.

20. The non-transitory computer readable medium of claim 19, wherein the derivative object includes one or more derivative properties and the one or more derivative properties include the property.

* * * * *